March 29, 1966 C. B. VAUGHAN 3,243,751

WIRE WOUND TOROID

Original Filed Jan. 15, 1962 2 Sheets-Sheet 1

INVENTOR.
CARROLL B. VAUGHAN
BY Herbert L. Davis
ATTORNEY

March 29, 1966 C. B. VAUGHAN 3,243,751

WIRE WOUND TOROID

Original Filed Jan. 15, 1962 2 Sheets-Sheet 2

INVENTOR.
CARROLL B. VAUGHAN
BY Herbert L. Davis
ATTORNEY

United States Patent Office 3,243,751

Patented Mar. 29, 1966

3,243,751

WIRE WOUND TOROID

Carroll B. Vaughan, East Orange, N.J., assignor to The Bendix Corporation, a corporation of Delaware Original application Jan. 15, 1962, Ser. No. 166,343. Divided and this application Sept. 25, 1963, Ser. No. 315,735

2 Claims. (Cl. 336—196)

The present application is a division of U.S. application Serial No. 166,343, filed January 15, 1962, by Carroll B. Vaughan, now U.S. Patent No. 3,213,520, granted October 26, 1965, and assigned to The Bendix Corporation. The present invention relates in general to wire wound toroids, and more particularly to a structure of an improved wire wound toroid.

In the construction of auto transformers, potentiometers, and similar electromechanical equipment, characterised by a wire surface, in electrical contact with a slider, or contact brush, difficulty is often encountered in the preparation of the wire surface. The wire contact surface should have the properties scheduled below.

(1) The segments of wire on the contact surface should lay perfectly flat against the core or other under material.

(2) None of the wire segments should bulge.

(3) None of the wire segments on the contact surface should overlap a neighboring wire.

(4) The wire and especially the segments of wire on the contact surface must be of uniform thickness.

(5) The segments of wire on the contact surface must be insulated from each other and from the core or other under material.

(6) And most important, the segments of wire on the contact surface must make good electrical contact with the slider or contact brush.

The foregoing structure is particularly important in the construction of a wire wound toroid providing segmental wire contact surfaces about an outer cylindrical surface of sufficient length as to afford good electrical contact with a multiplicity of slider or contact brushes adjustably mounted in cooperative relation therewith.

The present invention is directed to a novel structure and a novel method of preparing the wire contact surface on the outer cylindrical periphery of a wire wound toroid so as to provide segmental wire contact surfaces such as to afford good electrical contact with a multiplicity of electrical contact brushes adjustably positioned about the periphery of the wire wound toroid.

Heretofore, manufactures of wire wound toroids with adjustable brush contact have had difficulty in preparing a satisfactory contact surface on the outer periphery of the toroid. This difficulty led manufacturers to place the contact surface at the end portions of the toroid or to limit the contact surface of the toroid to a very narrow band on the outer cylindrical periphery of the toroid.

An object of the invention is to provide a novel structure and novel method of preparing a toroid so that substantially the entire outer cylindrical surface of the wire wound toroid core is suitable for electrical contact with a plurality of sliders or contact brushes.

Another object of the invention is to provide a novel method of preparing a wire wound toroid so that the windings on the outer cylindrical periphery of the toroid are even with each other, are insulated one from each other, and from the core or other under material, and are adapted to provide a good electrical contact with a slider or brush traveling thereover.

A further object of the invention is to provide a novel method of preparing the wire winding on a toroid.

Another object of the invention is to provide an improved wire wound toroid core with the outer cylindrical surface of the core perfectly circular in the cross section area.

These and other objects and features of the invention are pointed out in the following description in terms of the embodiment thereof which is shown in the accompanying drawings. It is to be understood, however, that the drawings are for the purpose of illustration only and are not a definition of the limits of the invention, reference being had to the appended claims for this purpose.

Figure 1:
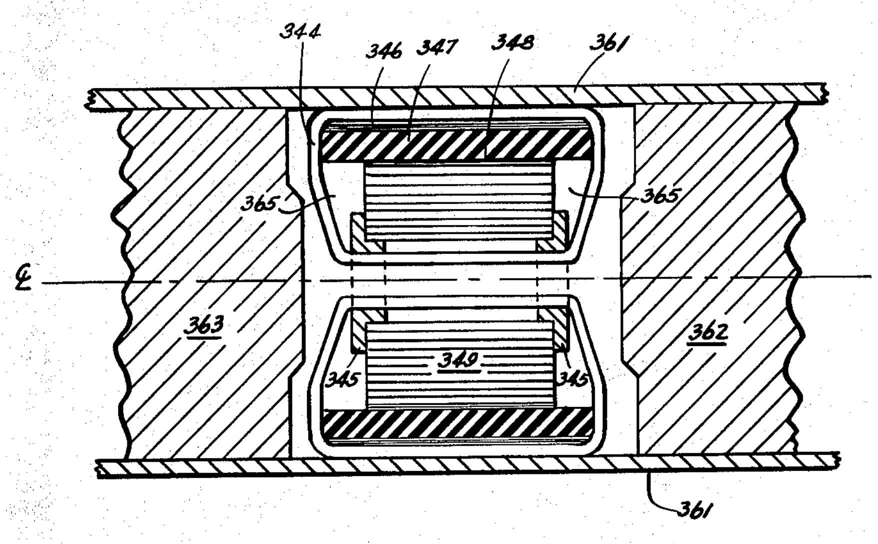
FIGURE 1 is a longitudinal sectional view of an improved toroid showing a core and winding of a toroid being prepared in a die in accordance with the teachings of the invention.
Figure 2:
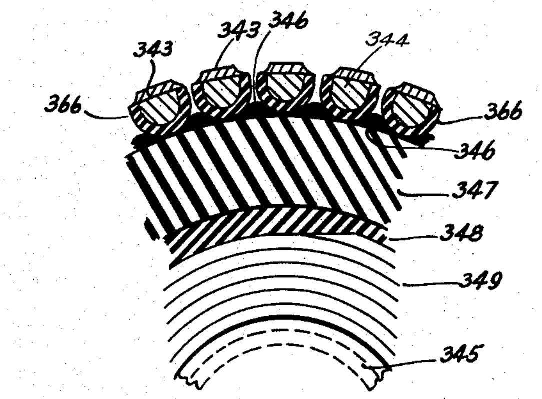
FIGURE 2 is a cutaway cross-section view of the improved toroid.

Referring to the drawings of FIGURES 1 and 2, there is shown a cutaway longitudinal view and a cutaway cross sectional partial view respectively of a toroid core 349 which may be constructed in a conventional manner of a wound roll of ribbon-core ferrous material. Heretofore, in such ribbon wound cores, there has been encountered a problem in that the core may have a slightly elliptical form and vary in overall diameter. In order to compensate for this condition, the core 349 may be compensated by wrapping or building up the core 349 with a paper, molded plastic, or other shim-like material 348 so as to make the core 349 into a more perfect cylinder of a true circular form. The shim or paper may be of a material such that will not be adversely affected by the subsequent plating process. The insulation sleeve former 347 is placed over the shim-wrapped toroid core 349, and the sleeve former 347 may be of a suitable rigid insulating tubular material, for example, of a phenol type, and the sleeve former 347 may, for example, have a wall thickness of approximately ⅛ inch and be of a length ¼ of an inch longer than the toroid core itself. The inside diameter of the insulating sleeve 347 will often be slightly greater than the outside diameter of the toroid core 349. The adding of the shim material 348 may serve two purposes: first, to fill up any special gap between the outside diameter of the core 349 and the inside diameter of the sleeve 347; and second, to compensate for any elliptical shape of the toroid core 349 which might be caused by the ribbon wound material thereof.

An insulating washer 345 is placed at each inside corner of the core 349 to prevent cutting of a wire winding 344 as it presses against the inside corner of the toroid core as hereinafter described.

The outer cylindrical periphery of the toroid is then coated with a layer of heat forming adhesive 346.

The toroid core is now ready for winding, and an insulated electrical wire 344 is wound over the surface of the prepared toroid core. The wire, and the winding pattern, may be of any conventional or convenient type, for example, the wire may be No. 20 wire, and the winding may be of a pattern having a single layer of wire on the outer cylindrical periphery of the toroid.

The wound core is then inserted in a cylindrical forming die 361 (as shown in FIGURE 1) which presses inward on those segments of wire that are on the outer cylindrical periphery of the toroid. Two rams 362 and 363 apply pressure to the wire 344 where the core 349 joins the sleeving 347 (on FIGURE 1), to shape and uniformly tighten the wire 344. The tightening of the wire in this step is especially effective to tighten those segments of wire 344 laying on the cylindrical surfaces and in particular, the outer cylindrical surface. The die 361 holds the segments of wire on the outer surfaces flat, and the rams 362 and 363 apply identical pressure at both ends of each segment of wire. Any slack in the segments of wire is taken up by the dies forcing the wire 344 into free spaces 365 at the sides of the core just below the sleeving 347.

The rams 362 and 363 and the forming die 361 are then removed; and a cylindrical collar (which may be the same piece as the forming die 361), is placed over the outer cylindrical surface of the wound toroid. The toroid is baked to produce setting of the adhesive 346. It is to be noted that the baking takes place while a collar (which may be the same as the forming die 361) is holding the segments of wire on the outer cylindrical surface in place.

After baking, the collar (or die 361) is removed, and the wound toroid is mounted between conical or other centering means (not shown). An outer segment (e.g. $\frac{1}{20}$ of the diameter) of the wire 344 (as shown in FIGURE 2) is milled forming a commutator type surface. In this step, any excess adhesive and some wire insulation 366 is removed from the wound wire.

In the aforenoted process, as described and claimed in U.S. Patent No. 3,213,520, any elliptical form of the core 349 which might otherwise result from the ribbon wound core is corrected by the application of the shim like material 348 so as to form the core 349 into a more perfect cylinder and in turn prevent the subsequent wire wound toroid from presenting an irregular surface. Thus in the subsequent milling of the wire segments on the outer cylindrical surface of the toroid as compensated by the shim material 348, the segments of wire 344 may be effectively milled to a uniform thickness and due to the compensating effect of the shim-like material 348 the wire segments lay evenly on the true cylindrical surface of the sleeving 347 without bulging or overlapping so as to be conducive to accurate operation of the device.

The outer segmental surfaces of the wire 344 are then each cleaned and plated with gold, rhodium, or other material indicated by the numeral 343 so as to assure good electrical contacting surfaces for cooperation with a plurality of brushes adjustably positioned about the periphery of the cylindrical toroid. The plated surfaces 343 prevent wearing of the soft copper wire 344 of the winding, and prevent fusing due to electrical arcing.

Figure 3:
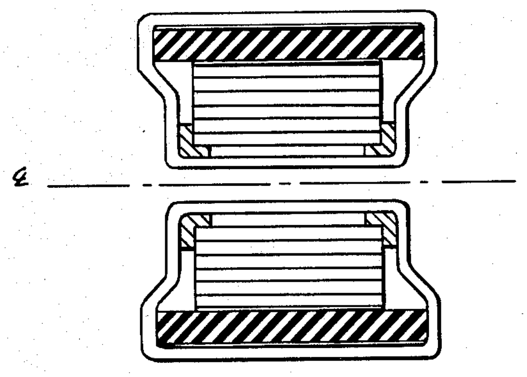
FIGURE 3 is a longitudinal sectional view of the improved toroid formed by the novel process of the present invention.
Figure 4:
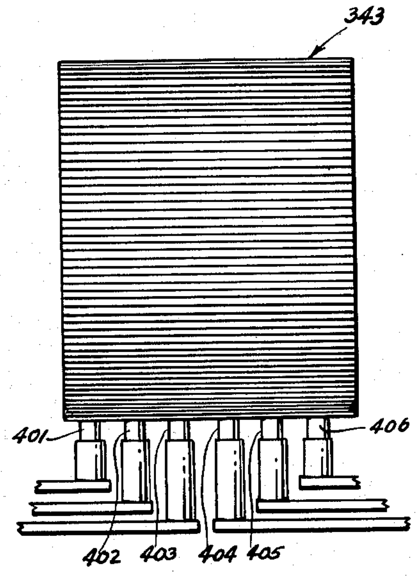
FIGURE 4 is a front view of the improved toroid in an operative assembled relation.

The toroid then has the form shown in FIGURE 3 and may be operatively assembled, as shown in FIGURE 4 so as to permit a plurality of contact brushes 401, 402, 403, 404, 405, and 406 to be adjustably positioned about the outer cylindrical surface of the wound core in varying contact relation with the surfaces 343 of the wound wires of the core as described and claimed in the copending U.S. application Serial No. 300,312, filed August 6, 1963, by Carroll B. Vaughan, as a division of U.S. application Serial No. 166,224, filed January 15, 1962, by Carroll B. Vaughan, and assigned to The Bendix Corporation, assignee of the present invention.

Although only one embodiment of the invention has been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. A wire wound toroid comprising a toroidal shaped core having inner and outer cylindrical surfaces and two end surfaces; a wire winding on said core including commutator portions of the wire winding over the outer cylindrical surface of the core; a rigid insulating sleeve between the outer cylindrical surface of the toroid core and the wire winding, and said sleeve extending in length beyond the ends of said toroid core to provide a free space at the ends of the toroid between the toroidal winding and the ends of the toroid core so that upon the application of an inward pressure to end portions of said wire winding forcing said end portions of the wire winding into the free space there is effected a tightening of the commutator portions of the wire winding on the outer cylindrical surface of the core; shim material between the toroid core and the sleeve to fill spacial gaps therein and to compensate for any elliptical shape of the toroid core; two annular washers, one at each juncture of the inner cylindrical surface of the core with the ends of the core for preventing cutting of the end portions of the wire winding at said junction upon the application of said inward pressure to said end portions of the wire winding.

2. In a wire wound toroid comprising a toroid core having inner and outer surfaces and two end surfaces, a toroidal wire winding on said toroid core including a commutator type finish on segmental portions of the wire winding over the outer surface of the toroid, insulating means between the outer surface of the toroid and the wire winding, shim material between the toroid core and the insulating means adapted to fill any spacial gaps therein and to compensate for any elliptical shape in the outer surface of the toroid so that the insulating means may provide an outer surface in contact with the winding of perfectly cylindrical form, and means for adhering said segmental portions of the wire winding to the outer cylindrical surface of the insulating means so that the commutator type finish on the segmental portions of the wire winding lay flat thereon.

References Cited by the Examiner

UNITED STATES PATENTS

| | | | |
|---|---|---|---|
| 2,985,857 | 5/1961 | Ellin et al. | 336—149 X |
| 3,041,563 | 6/1962 | Carlsen | 336—149 |

ROBERT K. SCHAEFER, *Primary Examiner.*

JOHN F. BURNS, *Examiner.*

C. TORRES, *Assistant Examiner.*